Sept. 18, 1962 G. F. SHEPHERD 3,054,135
CASTERS
Filed Dec. 2, 1959 2 Sheets-Sheet 1

Inventor
George Frederick Shepherd
By Mann, Brown and McWilliams
Attys.

Sept. 18, 1962  G. F. SHEPHERD  3,054,135
CASTERS

Filed Dec. 2, 1959  2 Sheets-Sheet 2

Inventor
George Frederick Shepherd
By Mann, Brown and McWilliams
Attys.

United States Patent Office 3,054,135
Patented Sept. 18, 1962

3,054,135
CASTERS
George Frederick Shepherd, 11 Manor St.,
Brighton, Victoria, Australia
Filed Dec. 2, 1959, Ser. No. 856,723
Claims priority, application Australia Dec. 12, 1958
3 Claims. (Cl. 16—18)

This invention relates to casters for use with articles of furniture and other mobile appliances or machines and is directed to the type of caster, the subject of my prior Australian Patent Nos. 122,566 and 136,548 (see also my U.S. Patent 2,539,108, granted January 23, 1951).

In the specifications of the above patents there is disclosed a caster presenting a generally overall spherical configuration wherein a relatively rotatable caster section having a generally hemispherical configuration and including the caster floor engaging tread or roller is rotatably mounted upon an inclined spindle or axle fixed to a generally hemispherically contoured swivelling caster section (the configuration of which substantially complements that of the rotatable caster section) which has an offset socket to receive a vertical pivot axle or spindle that is to be secured to the article of furniture or the like.

The principal objective of the present invention is to provide an improved efficient caster of the type specified of a construction to facilitate the effective use of a rubber or like material upon the tread of the floor engaging wheel or roller of the caster without having to depart significantly from the overall generally spherical contour of the roller.

It is a further objective of the present invention to provide such a rubber treaded caster having a sensitive self-aligning and correct castering action and capable of efficiently carrying the maximum calculated or predetermined load without shimmy or shimmying and with the minimum of friction whilst maintaining the basic advantages of the abovementioned type of caster.

The advantages may be briefly stated to include the provision of a vertical pivot spindle within the wheel, long bearings within sealed oiled reservoirs, all working parts effectively enclosed and maintained in assembled form without screws or like fastening members.

A further objective of the invention is to provide such an improved efficient caster having a surface engaging roller with a rubber tread of reduced width relatively to existing casters so as to achieve self-aligning of the caster without shimmy upon tiled or like hard surfaces.

It is a further objective to provide a rubber treaded caster with improved trailing action by increasing the offset distance and still maintaining the swivel bearing within the wheel.

It is a further objective to provide a rubber treaded caster having a larger diameter wheel and a relatively narrow tread capable of making sudden changes in direction of motion without shimmy, and without the requirement of any substantial increase in the weight and strength of the general structure of the caster.

It is a further objective to provide a rubber treaded caster in which the main members are die-cast for economical production but including a steel rim or base onto which the rubber tread can be securely bonded, the cured rubber not being subjected to any detrimental manufacturing process such as electro plating, spraying, or stoving.

It is a further objective to provide a rubber treaded caster designed as a light mass-produced article wherein the two movements of rolling and swivelling will always blend smoothly into one curve without shimmy, vibration, or friction.

With the above stated principal objective in view there is provided according to this inventtion, a caster of the abovementtioned type in which the inclined floor engaging roller of the relatively rotatable caster section comprises a composite member having an inner cylindrical or dish shaped metallic member, and a tread ring composed of rubber or like mouldable material bonded to the face of said member.

More specifically there is provided according to the invention a caster of the type herein specified in which the inclined floor engaging roller of the relatively rotatable section of the caster comprises a composite member consisting of an inner cylindrical or dish shaped metallic member having an external tread ring composed of rubber or like material bonded to the rim of said member, a central aperture in said member, a separate hub projecting through said aperture and secured to the end or side of said member, said hub being bored or centrally recessed to form a bearing for the inclined axle of said roller, which axle is secured to the swivelling section of the caster.

Conveniently, the above rotatable tread roller is of larger diameter relatively to the body of the caster and the rubber or like tread is narrow, less inclination being provided for said roller relatively to the swivel or pivot spindle in comparison with the caster the subject of my abovementioned prior patents, whilst the centre spherical portion is designed to accommodate an axle bearing of four diameters in length, it remains similar to previous casters of this type for a similar load rating.

This modification with regard to roller diameter and tread width is found desirable because of the flattening of the rubber tread at point of contact with the floor and the tendency for the roller to take a curved track had to be overcome by reducing the width of the tread and reducing the angle of inclination of the roller to the vertical swivelling spindle. During research on the production of rubber-treaded casters, it was also found necessary to substantially increase the offset distance from pivot to axle in comparison with metal tread casters of similar capacity. Thus the present construction provides for the housing of the swivel or pivot spindle to be disposed outside the centre spherical body of the caster, yet inside the diameter of the wheel, thus allowing a greater offset than is possible in the casters at present employed.

The inner metallic member of the caster roller of wheel, preferably consisting of a steel pressing, provides a much tougher rim or base for the rubber floor engaging tread than is possible with any cast metal. Casters are frequently subjected to heavy strain due to overloading and/or having to traverse grooves and projections in faulty floors. These conditions usually result in the first damage experienced by the head rim of the wheel, and if the roller or wheel is composed of die-cast metal, which is low in tensile strength and ductility, the wheel will readily fracture, and resultantly the whole caster may have to be discarded.

The abovementioned hub to which the roller dished member is secured is flanged and rivetted to the end (or base) of the dished member, and a spherically contoured snap on closure cap or cover is fitted over the flange of said hub to complete this complemental section and retain the desired generally spherical overall configuration of the caster.

The swivelling caster section comprises a hollow body flanged and proportioned to peripherally freely fit within the annular recess defined by the caster rotatable section dished metallic member, with the hollow body carrying respectively the abovementioned inclined axle, and an internal hollow swivelling boss within said body at one side of the axle to form a bearing for the upright or vertical pivot spindle that is to be fitted into or attached to the article of furniture or the like to form a vertical pivot axis for the caster.

The rotatable caster section hub may be formed with an annular groove to receive a single fixed retaining member to couple the caster sections together as described in the specifications of my prior patents.

The accompanying drawings depict a practical arrangement of a caster according to this invention.

Figure 1:
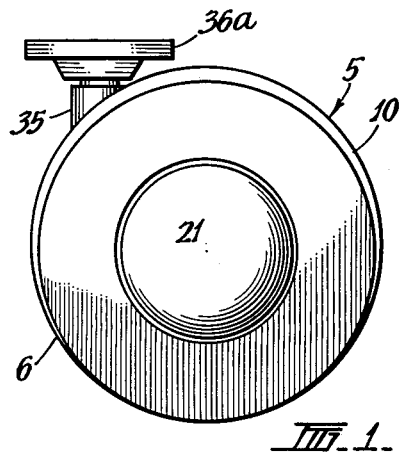
FIGURE 1 is a side elevation of the caster.

Referring now to the drawings, the relatively rotatable section is indicated generally at 5 and includes the floor engaging roller 6 consisting of a cylindrical or dish shaped hollow member 7, which is pressed from steel or spun to the shape indicated to provide an external arcuate or segmental face 8.

Figure 8:
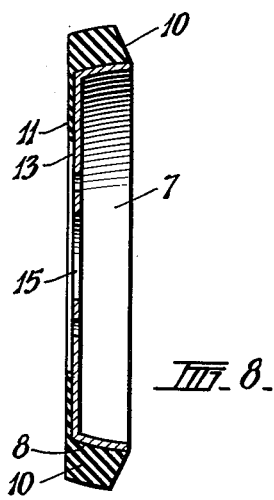
FIGURE 8 is a detail view in section of the rotatable caster section annular dished metallic member that forms the caster roller, with the dished member having the rubber floor engaging tread applied thereto.

Conveniently the face 8 is radial to a point on the axis of the dish shaped member 7 without but close to body of said member 7, as apparent from FIGURE 8.

Figure 4:
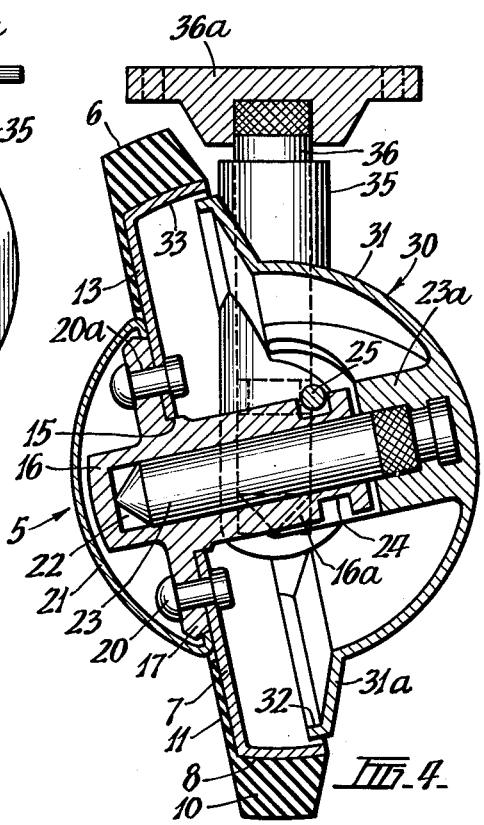
FIGURE 4 is an enlarged vertical section taken through the body of the caster.

A rubber tread ring 10 is bonded to the face 8 of the dish shaped member 7, the ring being moulded with an internal arcuate wall to accurately fit the face as shown in FIGURES 4 and 8.

The tread ring 10 has a relatively thin annular base portion 11 to similarly fit the side 13 (or base) of the dish shaped member 7, whereby a complete and positive bonding of the tread and said member may be effected to resist displacement over long periods of use of the caster.

As the caster has a rubber tread ring 10, it is essential that the rubber (or other similar mouldable material) must be firmly bonded to its metal base. Bonding onto zinc base alloys is difficult and unreliable, as the metal has to be etched and chemically clean and the rapid rate of oxidisation makes the process very critical. However, bonding rubber onto steel has proved to be very reliable in many industries, and has been utilised in this invention in connection with the bonding of the tread ring 10 to the above pressed steel dish shaped member 7.

As mentioned hereinbefore, it is desirable that casters achieve self-alignment without shimmying, vibration, or friction, and I found that, in working with casters of the type described in my above mentioned patents in which the rollers of such casters were treated by using an appropriate rubber treading, the tread would flatten to its point of contact with the floor, and since the roller is inclined with respect to the floor, the result was that the caster roller in operation tended to take the curved track that is associated with shimmying, etc.

I found that such shimmying can be eliminated by making the roller tread, for instance, tread ring 10, no wider than about one-eighth of the tread diameter, and disposing the caster roller so that its angle of inclination with respect to the caster vertical swivel spindle or pin is on the order of 12 degrees.

Since the tread ring 10 is relatively narrow in width, steel is the most suitable material for making dished shaped member 7 because of the aforementioned reliability of bonding rubber to steel.

Incidentally, the use of a steel pressing in the production of the dish shaped member 7 is a valuable manufacturing aid, inasmuch that it can be completely enclosed within the moulds for forming the rubber tread, and the high temperature and pressure required in curing the rubber does not deform, blister, or warp the steel, a constant risk with die-castings.

Figure 9:
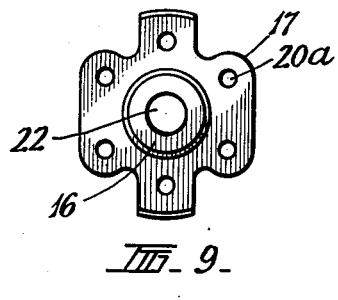
FIGURE 9 is a front elevation of the caster roller mounting hub that is to be attached to the above annular dished metallic member to journal same on the axle of caster swivelling section.
Figure 11:
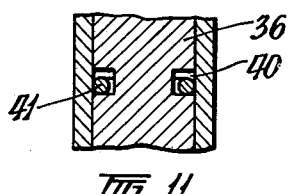
FIGURES 10 to 12 illustrate a modified construction of means for retaining the caster sections in assembly.

The dish shaped member 7 is provided with a central aperture 15 in the side 11 through which aperture 15 a die cast hub 16 projects having a somewhat star shaped flange 17 adapted to seat against the outer side 13 (or base) of said member 7 about its central aperture 15. The above mentioned flange 17 is fully illustrated in FIGURE 9 and it is rivetted as at 20 to the side 13 of the dish shaped member 7, and a snap-on spherically contoured cover 21 fits over the flange 17 to complete the relatively movable section of the caster as viewed in FIGURE 4.

The hub 16 is normal to and projects into and through the dish shaped member 7, hub 16 being formed with a deep socket or bore 22 to receive an inclined pin 23 forming the axle about which the relatively rotatable caster section 5 rotates with the tread ring in floor engagement. Adjacent its inner end, the hub 16 is formed with an annular groove 24 to receive a single retaining member such as keeper pin 25, which maintains the generally spherically contoured complemental caster body sections in assembly.

The suggested die-cast making of hub 16 is an efficient and economic method of making the hub centre bearing structure to finished sizes without the requirement of machining. The main centre bearing portion 16a is cored as at 22 to size, leaving a hard external skin on the hub 16 which forms a very efficient bearing surface for the pin 23; preferably, this bearing surface is approximately four diameters in length (that is, such bearing surface has a length that is approximately four times the diameter of socket 22). Rivet holes 20a are all cast in place in the flange 17 of the hub but alternatively, the die-cast hub 16 can be formed with a finished domed exterior surface, in which case, the interior side of the dome carries a spigot and flange to receive the steel pressed member, which is secured by spinning, swaging or rivetting the die-cast metal from the inside.

The above snap cover 21 advantageously reduces the cost of production and obtains manufacturing advantages by reducing the amount of zinc alloy used in making the die-cast hub 16 to permit more reliable construction of press rivetting four or more soft rivets, in preference to spin rivetting the alloy, and by decreasing the cost of plating in covering the end of the die-cast hub 16. The spherical contour of cover 21 also preserves in a substantial way the generally spherical configuration that is preferred for the type of caster under consideration.

The relative rotatable section 5 of the caster, including the floor engaging roller 10 is free to rotate upon the pin 23 despite the engagement therewith of the retaining member 25.

The other complemental caster section, or caster swivelling section, is indicated generally at 30, and comprises a hollow body in the form of a flanged generally hemispherical member 31, a narrow peripheral flange 32 of which is provided with a diameter adapted to permit the flange 32 to neatly and freely fit within the recess 33 of the dish shaped metal member 7 of the above described caster floor engaging tread section as shown in FIGURE 4.

Figure 5:
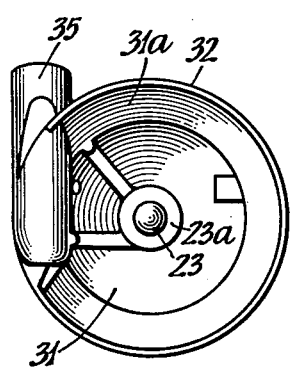
FIGURE 5 is a view in elevation looking into the interior of the swivelling section of the caster.
Figure 6:
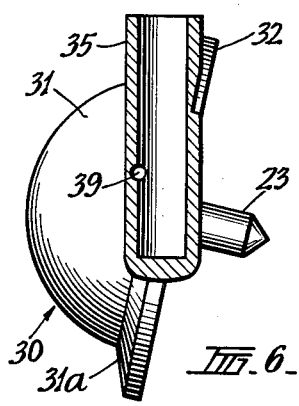
FIGURE 6 is a detail view in section of the swivelling section of the caster showing the body of the swivelling section, the socket for the vertical pivot pin or spindle, and the inclined axle on which the rotatable caster section is to be mounted.

The abovementioned pin 23 is secured in a central stepped boss 23a defined by the hemispherical member 31 within same and pin 23 projects axially from within the member 31 to fit into the socket 22 of the abovementioned hub 16 of the complemental caster section 5, as above described and illustrated in FIGURE 4. The swivelling socket 35 for the pivot spindle 36 is integral with the hemispherical member 31 and projects downwardly into the interior of the latter to a point below the pin 23 as shown in FIGURES 4 and 6. The swivelling socket 35 is inclined relatively to and intersects the axis of the hemispherical member 31 coincident with the axis of the pin 23; preferably socket 35 is disposed with respect to member 31 such that the swivel axis defined by socket 35 will be disposed outside of the spherically contoured portion of member 31 but within the diameter of roller 6, and it will be found that this permits a substantial increase in the off-set distance between the pivot axis of socket 35 and the axis of pin 23, in casters of the type under consideration (this obviously increasing the swivel sensitiveness of the caster). The upper end of the spindle 36 is fixed to the horizontal plate 36a adapted for attachment to the article of furniture, machine or the like. The spindle 36 in use is vertically disposed, projecting upwardly substantially in tangential relation to the concentric conical section 31a about the hemispherical body 31 as shown in FIGURES 2 and 5 to present a symmetrical arrangement in the end view as shown in FIGURES 2 and 5.

In the side or front view as illustrated in FIGURES 1 and 4 the swivelling socket 35 and spindle 36 are vertical, and consequently the pin 23 of the rotatable complemental caster section 5 is relatively inclined to dispose caster section 35 at an angle of about 12° to said spindle 36.

Thus, upon the complemental caster sections 5 and 30 being brought into assembly and the retaining member or rod 25 inserted through the aperture 39 in the outer side of swivelling socket 35, the annular groove of spindle 36 (see FIGURE 4), and the annular groove 24 in the pin 23 to complete the attachment of the caster sections to each other, the positioning of the swivelling socket 35 and pivot spindle 36 in the upright or vertical position will locate the rotatable caster section 5, and its floor engaging roller 10, at the required plane of operative inclination i.e. about the abovementioned angle of 12° to axis of the swivelling of spindle 36 as shown in FIGURE 4.

Figure 2:
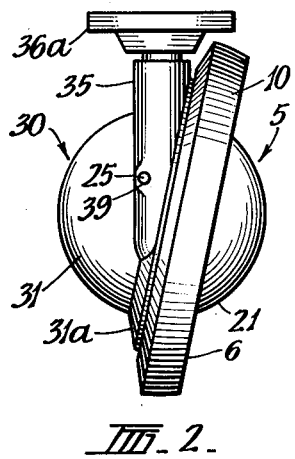
FIGURE 2 is an end elevation of the caster.
Figure 3:
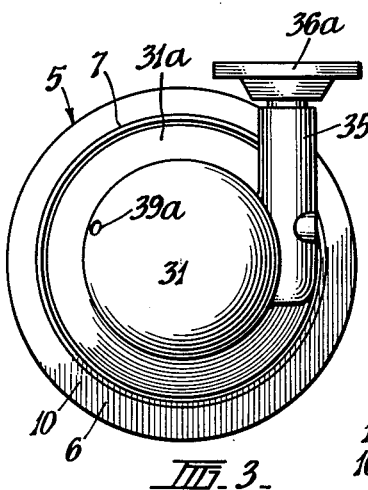
FIGURE 3 is a side elevation taken from the left hand side of FIGURE 2.
Figure 7:
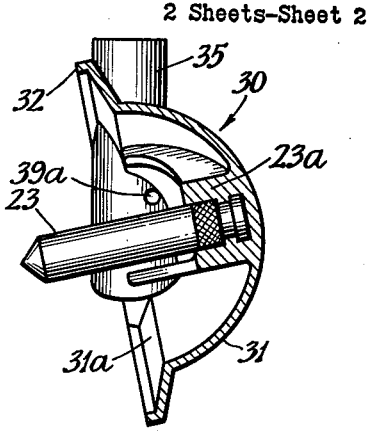
FIGURE 7 is a detailed view in section of the swivelling section of the caster showing the hollow body and the inclined axle.

The above mentioned aperture 39 in the swivelling socket 35 and apertures 39a in the wall of the hemispherical body shown in FIGURES 2, 6 and 7 are disposed to align with the annular groove in the pin 23 to effect the simple locked assembly of the complemental caster sections 5 and 30 described. The convenient removal of the pin 25 permits the parting of said sections 5 and 30 to facilitate lubricating and maintenance operations.

The socket 35 and inclined hub socket 23 also serve as lubricant holders.

Figure 12:
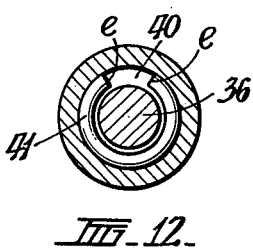
Figure 10:
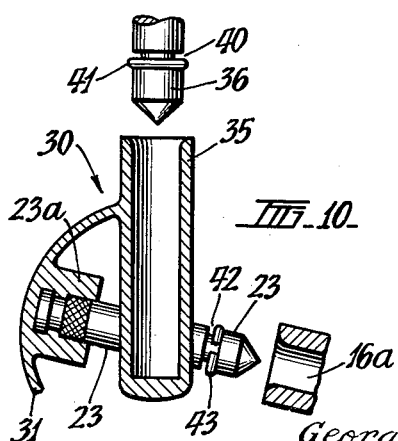

Referring now to FIGURES 10 and 12, the single retaining member 25 may be replaced by the alternative arrangement shown in which the pivotal spindle 36 has formed therein in the lower socket or bearing engaging portion an annular groove 40 in which is disposed a resilient split retaining ring 41 composed of spring wire of the required gauge.

Similarly the inclined axle 23 has an annular groove 42 adjacent to the inner end in which is also fitted a resilient split retaining ring 43. Each retaining ring 41 and 43 is of a diameter to peripherally protrude from its annular groove when initially fitted so as to be deformed and compressed upon the pivot spindle 36 and inclined axles 23 being forced into their respective bearings.

To assist in assembly of the components the mouth of the socket 35 and bearing 16a is rounded or chamfered to facilitate the forced insertion of the pivotal spindle 36 and inclined axle 23.

In assembly, the split retaining rings 41 and 43 frictionally engage the internal wall of the swivelling socket 35 and bearing 16a to positively retain the component swivelling section 30 and relatively rotatable section 5 in the required operative assembly shown in FIGURE 4.

The extending ends e of the split wire rings 41 and 43 tend to press strongly against the face of the socket and bearing with a high unit pressure. The reduced area of contact and the stiffness of the wire spring rings tend to cause the ends to bite into the surface of socket and bearing. Consequently, the inclined axle and pivot spindle and socket are in each case secured together snugly with the socket and bearing and there is none of the lost motion or play which is frequently found in devices of the prior art.

The components of the caster are assembled by introducing a charge of lubricant to each of the above bearing and socket and then pressing together the corresponding inclined axle and pivot spindle into them. The lubricant is retained in the socket and bearing whereby all parts which bear upon each other are continuously lubricated. Attention is called to the fact that the annular grooves 40 and 42 which retain the split wire ring in each case is disposed near the end of the pivot spindle and inclined axle so that the same does not substantially weaken said spindle or axle against bending stresses. All of the parts fit together with a minimum of play or lose motion and consequently the device is attractive and highly effective.

The practical advantages of the present caster construction are principally from the aspect of economy and simplicity in construction and assembly, and may be generally stated as follows:

(1) The pressed steel roller base member 11 ensures the effective bonding of the rubber tread ring to said member.

(2) The die-cast hub provides a main bearing for the pin or axle of the inclined floor engaging roller without the cost of machining.

(3) The rivetting of the die-cast hub 16 to the pressed steel member 12 facilitates or materially assists in the moulding of the rubber tread ring 11, and prevents the die-cast hub being deformed by the heat arising from the rubber curing heat.

(4) The snap on steel cover 11 effects a considerable saving in zinc alloy as normally used and simplifies the plating by eliminating the step of immersing the die-cast hub in the various vats.

(5) The location of the pivot or swivel socket forms a bearing inside the caster wheel that is disposed immediately in front of but spaced adequately from the pin 23, so that the caster assembly can always align itself quickly to the direction of motion with the minimum of resistance. Experience has proved that a plain bearing in this ideal position is more effective than any type of ball-bearing placed several inches above ground level.

(6) The above approximate inclination of the floor engaging roller 11 and a rubber of 90 durometer hardness permits the diameter of the said roller to be seven or eight times the width of the tread ring. The offset is not directly proportional to the wheel diameter but generally should not be less than one quarter of the wheel diameter.

(7) The adaptability of the caster whereby the floor engaging roller may be inclined one way for two casters of a set, and inclined in the opposite way for the other two of a set of four, such that upon two of the same casters being mounted diagonally opposite to each other, to a four legged article of furniture or the like, a balanced action is obtained in all directions of motion, and a symmetrical appearance is presented to every aspect.

I claim:

1. In a caster of the sloping axle type, a hollow generally semispherical caster body having a vertical pivot socket closed at its lower end and formed adjacent one edge of the body, said semispherical caster body having an open side that is inclined with respect to said vertical socket, said semispherical body having an internal boss disposed on an axis perpendicular to said open side and in which one end of an axle is fixedly mounted in a downwardly sloping relation concentric with the open side of said semispherical body, said open side of the semispherical body including a closure flange extended outwardly away from the axis of said sloping axle, a swivel axle adapted at its upper end to be associated with an article of furniture or the like and extending downwardly into said vertical socket to provide a swivel axis for the caster body, and a caster wheel mounted on said sloping axle and comprising an annular member having a flat wall and an annular tread flange at its outer edge of a diameter greater than said closure flange and fitted over said closure flange, said flat wall of said annular member having a central opening therein and having fastening openings about said central opening, a separately formed hub member comprising a sleeve surrounding said sloping axle and closed at its lower end to provide a lubricant pocket, said hub member extending through said central opening in said flat wall of annular member, said sleeve having an integral mounting flange disposed in a plane perpendicular to the axis of said sleeve and spaced from the lower end of said sleeve, said mounting flange having spaced fastening openings formed therein, fastening means extended through said fastening opening in the mounting flange and said annular member flat wall for securing said hub member in fixed relation to said flat wall of said annular member, a cap formed to define a portion of a spherical surface of substantially the same diameter as said semispherical caster body and having a snap fit about the edge of said mounting flange to secure the cap in position over said mounting flange and over the closed lower end of said sleeve, and a resilient tread ring including a flat portion bonded to the outer face of said annular member flat wall outwardly of said cap and having an integral tread portion bonded to said annular member tread flange.

2. A sloping axle caster comprising a caster body with a closed bottom vertical pivot socket and an integral semispherical portion located at one side of the socket and having an open face for said semispherical portion inclined at an angle of approximately 12° with respect to the axis of the socket, the axis of said semispherical portion that is perpendicular to the plane of said open face being spaced horizontally from the axis of the socket, an inclined axle having one end rigidly fixed in said semispherical portion on said axis of the semispherical portion that is perpendicular to said open face, said semispherical portion having an outwardly projecting annular closure flange about said open face, and a caster wheel mounted on said sloping axle and comprising an annular member having a flat wall and an annular tread flange at its outer edge, a resilient tread bonded on said tread flange, said flat wall having a central opening therein, a separately formed hub member comprising a sleeve surrounding said sloping axle and closed at its lower end to provide a lubricant pocket, said hub member extending through said opening in said flat wall and said sleeve having an integral outward flange disposed in a plane perpendicular to the axis of said sleeve and spaced from the lower end of said sleeve, means fixing said hub member outward flange to said flat wall to thereby secure said hub member in fixed relation to said annular member flat wall, and a cap formed to define a portion of a spherical surface and having a snap fit about the edge of said hub member outward flange to secure said cap in position over said hub member flange and over the closed lower end of said hub member sleeve.

3. A caster according to claim 2 wherein said resilient tread has a width not substantially more than one-eighth of the diameter of the tread.

References Cited in the file of this patent

UNITED STATES PATENTS

| | | |
|---|---|---|
| 912,010 | Martin | Feb. 9, 1909 |
| 2,539,108 | Shepherd | Jan. 23, 1951 |
| 2,589,847 | Noelting et al. | Mar. 18, 1952 |
| 2,606,791 | Sphect | Aug. 12, 1952 |
| 2,631,328 | Kramcsak | Mar. 17, 1953 |
| 2,891,273 | Hutchinson | June 23, 1959 |